(12) United States Patent
Huang

(10) Patent No.: US 8,845,784 B2
(45) Date of Patent: Sep. 30, 2014

(54) COMPOSITE MIXED CARBONATE ION AND ELECTRON CONDUCTING MEMBRANES AND REACTANT GAS ASSISTED CHEMICAL REACTORS FOR CO2 SEPARATION AND CAPTURE

(75) Inventor: Kevin Huang, Export, PA (US)

(73) Assignee: University of South Carolina, Columbia, SC (US)

( * ) Notice: Subject to any disclaimer, the term of this patent is extended or adjusted under 35 U.S.C. 154(b) by 588 days.

(21) Appl. No.: 13/005,180

(22) Filed: Jan. 12, 2011

(65) Prior Publication Data
US 2011/0168572 A1 Jul. 14, 2011

Related U.S. Application Data

(60) Provisional application No. 61/335,753, filed on Jan. 12, 2010.

(51) Int. Cl.
| B01D 53/22 | (2006.01) |
| B01D 69/02 | (2006.01) |
| B01D 71/02 | (2006.01) |
| B01D 69/04 | (2006.01) |
| B01D 69/14 | (2006.01) |
| B01D 69/10 | (2006.01) |
| B01D 53/32 | (2006.01) |

(52) U.S. Cl.
CPC .............. *B01D 53/228* (2013.01); *B01D 53/32* (2013.01); *B01D 69/02* (2013.01); *Y02C 10/10* (2013.01); *B01D 53/229* (2013.01); *B01D 2251/202* (2013.01); *B01D 71/022* (2013.01); *B01D 69/04* (2013.01); *B01D 2251/204* (2013.01); *B01D 71/021* (2013.01); *B01D 69/142* (2013.01); *B01D 71/024* (2013.01); *B01D 2257/504* (2013.01); *B01D 2258/0283* (2013.01); *B01D 69/10* (2013.01)
USPC ................... 95/44; 95/51; 95/54; 96/4; 96/5; 205/763; 204/295

(58) Field of Classification Search
USPC ............... 95/45, 51, 44, 54; 96/4, 5; 205/763; 204/295
See application file for complete search history.

(56) References Cited

U.S. PATENT DOCUMENTS

| 5,820,659 A * | 10/1998 | Ekiner et al. .................. 96/8 |
| 6,793,711 B1 * | 9/2004 | Sammells .................. 95/48 |
| 7,572,318 B2 * | 8/2009 | Jadhav et al. .................. 95/51 |
| 2003/0131726 A1 * | 7/2003 | Thomas et al. .................. 95/51 |
| 2008/0011160 A1 * | 1/2008 | Bowman et al. .................. 95/51 |
| 2008/0011161 A1 * | 1/2008 | Finkenrath et al. ............... 95/51 |
| 2008/0115667 A1 * | 5/2008 | Lee et al. .................. 95/51 |
| 2010/0313758 A1 * | 12/2010 | Stevens et al. .................. 96/10 |

* cited by examiner

*Primary Examiner* — Jason M Greene
(74) *Attorney, Agent, or Firm* — Dority & Manning, P.A.

(57) ABSTRACT

The present disclosure relates to a system for carbon dioxide seperation and capture. The system includes a porous metal membrane comprising Ni, Ag, or combinations thereof and having molten carbonate within the pores. A $CO_2$ containing flue gas input stream is separated from a reactant gas input stream by the membrane. The $CO_2$ is removed from the flue gas input stream as it contacts the membrane resulting in a $CO_2$ free flue gas output stream and a $CO_2$ containing reactant gas output stream.

22 Claims, 1 Drawing Sheet

COMPOSITE MIXED CARBONATE ION AND ELECTRON CONDUCTING MEMBRANES AND REACTANT GAS ASSISTED CHEMICAL REACTORS FOR CO2 SEPARATION AND CAPTURE

CROSS-REFERENCE TO RELATED APPLICATION

The present application is based on and claims priority to U.S. Provisional Application 61/335,753 having a filing date of Jan. 12, 2010, which is incorporated by reference herein.

BACKGROUND

Fossil fuels will be the primary energy resources to power society for at least the next fifty years. The use of fossil fuels generates $CO_2$. Unfortunately, $CO_2$ is a greenhouse gas, the emissions of which to the atmosphere cause global warming, an alarming threat to humankind. An increased awareness of this problem is recognized in the changes of energy policy at both national and international levels. For the scientific and engineering communities, research activities in searching for means of effectively reducing $CO_2$ emissions has also increased considerably in recent years. This trend will continue for a sustained period of time in near future.

The technical approach to reduce $CO_2$ emissions is simply to avoid the emissions to the atmosphere by capturing and storing it at either pre-combustion or post-combustion stage. At either stage, $CO_2$ has to be separated from either a reducing fuel stream (pre-combustion) or an oxidizing flue gas stream (post-combustion) into a highly concentrated form, from which $CO_2$ can then be further compressed into a liquid form and stored via geologic sequestration. The technologies available for the $CO_2$ separation include primarily mechanical scrubbing and poly-amine solvent-based physical adsorptions. The former is mainly used in separating $CO_2$ from $CH_4$ (or natural gas) and the latter is widely employed in $CO_2$ separation in flue and fuel gas streams of power plants. Unfortunately, both methods are energy intensive and cost prohibitive for large-scale commercial applications. For example, it is estimated that the cost will be at $50-$60 per metric ton of $CO_2$ captured, which translates to $100 million per year for a refinery to invest the $CO_2$ capture technology. Therefore, developing a cost-effective and separation-efficient $CO_2$ capture technology is both scientifically interesting and industrially demanding.

As such, a need exists for a $CO_2$ capture technology that addresses the shortcomings of conventional approaches. Methods of utilizing such technology would also be desirable.

SUMMARY

The present disclosure relates to a system for carbon dioxide separation and capture. The system includes a porous metal membrane comprising nickel (Ni), silver (Ag), or combinations thereof and having molten carbonate within the pores. A $CO_2$ containing flue gas input stream is separated from a reactant gas input stream by the membrane. The $CO_2$ is removed from the flue gas input stream as it contacts the membrane resulting in a $CO_2$ free flue gas output stream and a $CO_2$ containing reactant gas output stream.

In certain embodiments of the present disclosure, a method of carbon dioxide separation and capture is provided. The method includes contacting a $CO_2$ containing flue gas input stream with a porous metal membrane comprising nickel (Ni), silver (Ag), or combinations thereof and having molten carbonate within the pores. The membrane separates the $CO_2$ containing flue gas input stream from a reactant gas input stream. The $CO_2$ is removed from the flue gas input stream as it contacts the membrane resulting in a $CO_2$ free flue gas output stream and a $CO_2$ containing reactant gas output stream.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

The present disclosure describes a novel mixed carbonate ion and electron conducting membrane that is capable of separating $CO_2$ from a flue gas stream. Different from the current poly-amine solvent-based physical-adsorption-in-principle technology, the proposed composite mixed conducting $CO_2$ separation membrane is based on electrochemical principles, and therefore has a sole selectivity to $CO_2$ but no limitation to the separation efficiency. The chemical reactors that are built on the membrane and assisted by the reactant gases are also presented.

Figure 1:
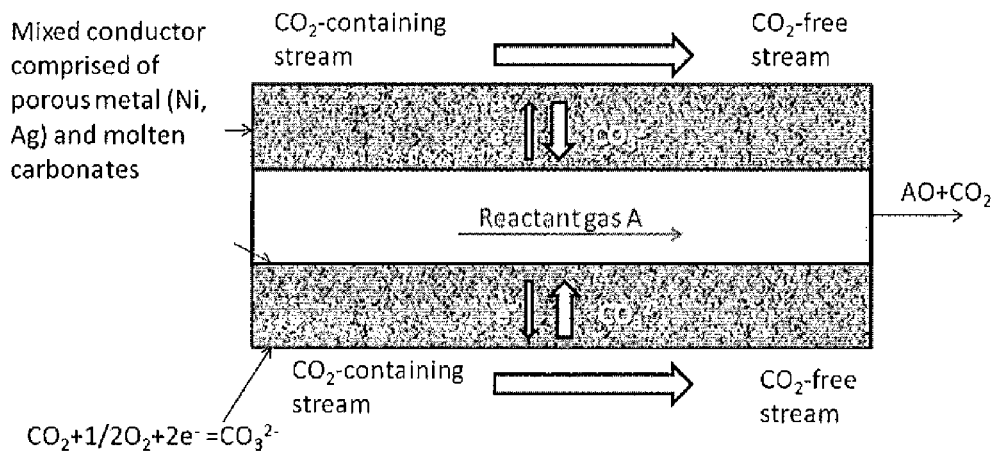
FIG. 1 illustrates a conceptual cross-sectional schematic of the mixed carbonate ion and electron conducting membrane in accordance with certain embodiments of the present disclosure.

The disclosed mixed carbonate ion and electron conductor is comprised of two phases. One phase is the porous substrate made of metal such as pure Ni, pure Ag, or combinations thereof. Another phase is the molten carbonates that are held within pores of the porous metal substrate by the capillary force. FIG. 1 shows the conceptual cross-sectional schematic of the composite mixed conductor in a tubular geometry. The functionality of the porous metal substrate is multiple. First, it provides the pathway for electrons to react at the gas-solid-liquid surfaces. Second, it also provides the physical pores for holding the molten electrolyte by the capillary force and mechanical structure for the membrane. During separation, the carbonate ions in molten carbonate electrolytes migrate from high end of chemical potentials of $CO_2$ and $O_2$ in the flue gas stream to the low end in the reactant gas. The electrode reactions at the two reactive surfaces are represented by:

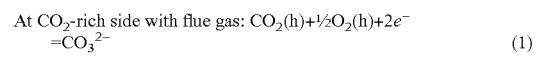

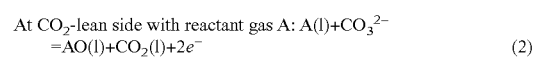

Overall reaction: $CO_2(h)+\frac{1}{2}O_2(h)+A(l)=AO(l)+CO_2(l)$ (3)

Reaction (3) depicts the completion of the separation of $CO_2$ from one side (high end) to another side (low end).

Figure 2:
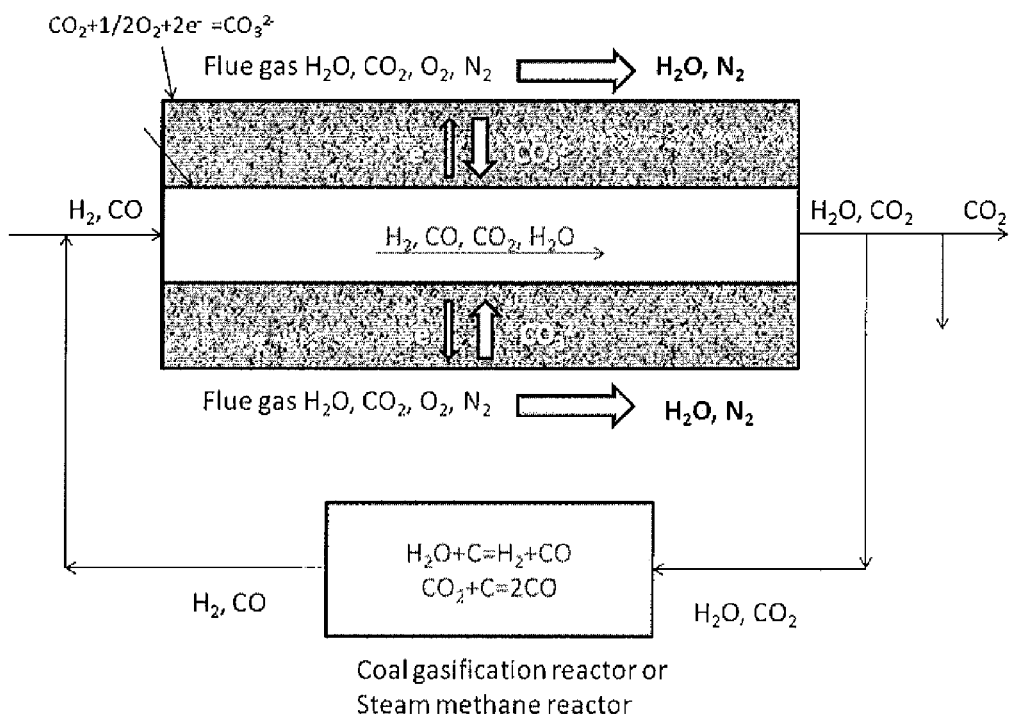
FIG. 2 illustrates a schematic of the $CO_2$ separation reactor based on mixed conducting membrane in accordance with certain embodiments of the present disclosure.

Selection of the reactant gas A is critical to the design of chemical reactors and successful separation of $CO_2$. It is apparent that the formed mixture of AO and $CO_2$ in the effluent has to be easily separable to allow a true separation of $CO_2$. One candidate reactant gas is $H_2$, with which a mixture of $H_2O$ and $CO_2$ can be formed in the effluent as a result of the reaction (2). A simple physical condensation of $H_2O$ at the downstream of the reactor can then be applied to obtain a pure stream of $CO_2$. Another candidate is CO, with which only $CO_2$ is the product after reacting with the membrane. No secondary separation is needed in this case. In practice, the mixture of $H_2$ and CO is an easier and more common form to obtain by traditional industrial processes such as coal gasification or methane reforming. Therefore, in FIG. 2 both kinds of reactant gases are used to illustrate the principle of the $CO_2$ separation chemical reactor built upon the proposed mixed conducting membrane. As shown, a component labeled Coal Gasification Reactor or Steam Methane Reactor is added to regenerate CO and $H_2$ that are needed for the subsequent $CO_2$ separation reactions by allowing a fraction of produced $H_2O$ and $CO_2$ to be recycled. The electrode and overall chemical reactions with $H_2$ and CO as the reactant gases are represented by At flue gas side: $CO_2(h)+\frac{1}{2}O_2(h)+2e^-=CO_3^{2-}$ (4)

At reactant gas side: $H_2(l)+CO_3^{2-}=H_2O(l)+CO_2(l)+2e^-$ (5)

$CO(l)+CO_3^{2-}=2CO_2(l)+2e^-$ (6)

Overall reaction: $H_2(l)+CO_2(h)+\frac{1}{2}O_2(h)=H_2O(l)+CO_2(l)$ (7)

$CO(l)+CO_2(h)+\frac{1}{2}O_2(h)=2CO_2(l)$ (8)

At the end, the chemical reactor produces two product lines: one is the $CO_2$-free stream containing only $N_2$ and $H_2O$; another is the pure stream of $CO_2$ after physical condensation of $H_2O$.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims. The metals Ni and Ag are used herein to illustrate the porous metal membrane of the present invention but are not intended to limit the scope of the invention.

What is claimed:

1. A system for carbon dioxide separation and capture comprising:

a porous metal membrane comprising Ni, Ag, or combinations thereof and having molten carbonate within the pores;

a $CO_2$ and $O_2$ containing flue gas input stream configured to contact a first surface of the membrane; and a reactant gas input stream containing reactants consisting of CO and/or $H_2$, the flue gas input stream being separated from the reactant gas input stream by the membrane, the reactant gas input stream being configured to contact a second surface of the membrane, wherein the $CO_2$ and $O_2$ of the flue gas input stream react as the flue gas input stream contacts the first surface of the membrane to form a carbonate ion according to the following reaction:

$CO_2+\frac{1}{2}O_2+2e^-\rightarrow CO_3^{2-}$, the carbonate ion migrating across the porous membrane to contact the reactant gas input stream at the second surface of the membrane, the carbonate ion reacting with the CO and/or $H_2$ of the reactant gas input stream according to the following reactions:

$H_2+CO_3^{2-}\rightarrow H_2O+CO_2+2e^-$ and/or $CO+CO_3^{2-}\rightarrow 2CO_2+2e^-$ resulting in a $CO_2$ free flue gas output stream and a $CO_2$ containing reactant gas output stream.

2. A system as in claim 1, wherein the $CO_2$ and $O_2$ containing flue gas input stream comprises $N_2$.

3. A system as in claim 1, wherein the $CO_2$ and $O_2$ containing flue gas input stream comprises $H_2O$.

4. A system as in claim 1, wherein the reactant of the reactant gas input stream consists of CO.

5. A system as in claim 1, wherein the reactant of the reactant gas input stream consists of $H_2$.

6. A system as in claim 1, wherein the $CO_2$ free flue gas output stream comprises $N_2$.

7. A system as in claim 1, wherein the $CO_2$ free flue gas output stream comprises $H_2O$.

8. A system as in claim 1, wherein the $CO_2$ containing reactant gas output stream comprises $H_2O$.

9. A system as in claim 8, wherein $H_2O$ is condensed from the $CO_2$ containing reactant gas output stream.

10. A method of carbon dioxide separation and capture comprising:

contacting a $CO_2$ and $O_2$ containing flue gas input stream with a first surface of a porous metal membrane comprising Ni, Ag, or combinations thereof and having molten carbonate within the pores, the membrane separating the $CO_2$ and $O_2$ containing flue gas input stream from a reactant gas input stream containing reactants consisting of CO and/or $H_2$, the reactant gas input stream contacting a second surface of the membrane, wherein the $CO_2$ and $O_2$ of the flue gas input stream react as the flue gas input stream contacts the first surface of the membrane to form a carbonate ion according to the following reaction:

$CO_2+\frac{1}{2}O_2+2e^-\rightarrow CO_3^{2-}$, the carbonate ion migrating across the porous membrane to contact the reactant gas input stream at the second surface of the membrane, the carbonate ion reacting with the CO and/or $H_2$ according to the following reactions:

$H_2+CO_3^{2-}\rightarrow H_2O+CO_2+2e^-$ and/or $CO+CO_3^{2-}\rightarrow 2CO_2+2e^-$ resulting in a $CO_2$ free flue gas output stream and a $CO_2$ containing reactant gas output stream.

11. A method as in claim 10, wherein the $CO_2$ and $O_2$ containing flue gas input stream comprises $N_2$.

12. A method as in claim 10, wherein the $CO_2$ and $O_2$ containing flue gas input stream comprises $H_2O$.

13. A method as in claim 10, wherein the reactant of the reactant gas input stream consists of comprises CO.

14. A method as in claim 10, wherein the reactant of the reactant gas input stream consists of $H_2$.

15. A method as in claim 10, wherein the $CO^2$ free flue gas output stream comprises $N_2$.

16. A method as in claim 10, wherein the $CO_2$ free flue gas output stream comprises $H_2O$.

17. A method as in claim 10, wherein the $CO_2$ containing reactant gas output stream comprises $H_2O$.

18. A method as in claim 17, wherein $H_2O$ is condensed from the $CO_2$ containing reactant gas output stream.

19. The system as in claim 1, wherein the reactants of the reactant gas input stream consist of CO and $H_2$.

20. The system as in claim 19, further comprising a coal gasification reactor or a steam methane reactor, wherein the reactant gas stream is generated in the coal gasification reactor or the steam methane reactor.

21. The method as in claim 10, wherein the reactants of the reactant gas input stream consist of CO and $H_2$.

22. The method as in claim 21, further comprising generating the reactant gas input stream in a coal gasification reactor or a steam methane reactor.

\* \* \* \* \*

UNITED STATES PATENT AND TRADEMARK OFFICE
CERTIFICATE OF CORRECTION

Page 1 of 1

PATENT NO. : 8,845,784 B2
APPLICATION NO. : 13/005180
DATED : September 30, 2014
INVENTOR(S) : Kevin Huang It is certified that error appears in the above-identified patent and that said Letters Patent is hereby corrected as shown below:

On the Title page item (57)

Abstract, line 2: "seperation" should read -- separation --

In the Claims

Column 4, line 9: "input stream being," should read -- input stream being --

Column 4, lines 32 - 33: "reactant of the, reactant" should read -- reactant of the reactant --

Column 4, lines 34 - 35: "reactant of the, reactant" should read -- reactant of the reactant --

Column 5, line 4: "$O_2$containing" should read -- $O_2$ containing --

Column 5, line 6: "$O_2$containing" should read -- $O_2$ containing --

Column 5, line 8: Remove "comprises"

Column 5, line 11: "$CO^2$" should be -- $CO_2$ --

Signed and Sealed this
Fifteenth Day of September, 2015

Michelle K. Lee
*Director of the United States Patent and Trademark Office*